Jan. 1, 1952 A. F. KNOBLAUGH 2,580,436
PIN BEARING, MATERIAL THEREFOR AND METHOD OF MAKING
Filed April 10, 1948

Armand F. Knoblaugh
INVENTOR.

BY
ATTORNEYS.

Patented Jan. 1, 1952

2,580,436

UNITED STATES PATENT OFFICE 2,580,436

PIN BEARING, MATERIAL THEREFOR, AND METHOD OF MAKING

Armand F. Knoblaugh, Cincinnati, Ohio, assignor to The Baldwin Company, Cincinnati, Ohio, a corporation of Ohio Application April 10, 1948, Serial No. 20,316

12 Claims. (Cl. 308—238)

My invention relates to bearings and more particularly to pin bearings, such as are used in pianos in the pivotal connections forming part of the actions of such musical instruments.

A primary object of the invention is to provide a material suitable for the bearings in these pivotal connections, which material can be made by machinery in continuous-type operations, and which can be united with the bearing holders to provide suitable bearings for the purpose, by machine operations.

Another object is to provide a material for and method of making bearings in which the component materials employed and the use of material are economical.

Still another object is to provide a bearing assembly which, once the bearing material is united with its holder, is suitable as a bearing without further mechanical operations upon it.

The manner in which these objects are accomplished, and the accomplishing of other objects, which will be pointed out later herein or will become apparent to those skilled in the art on reading this specification, will now be described in detail, reference being made to the accompanying drawings forming a part hereof, wherein.

The pivotal connections in a piano action, i. e., the centers on which the action members swing back and forth, must be durable, low in friction, firm with little side-play or "knock," and quiet in operation. As currently made, the bearings, or bushings, for these centers are formed from a woven wool cloth (known in the art as bushing cloth) by a great number of manual operations. The cloth is first dipped in water and upon drying is severed into strips the width of which is substantially the circumference of the bearing holes to be bushed.

Figure 4:
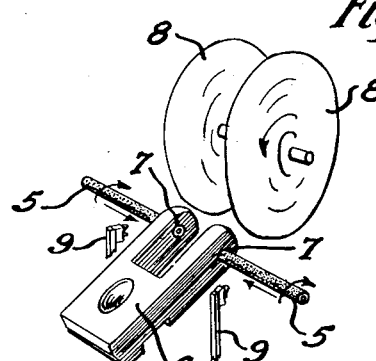
Figure 4 is a diagram indicating a method of forming bearings in a piano action member, using material such as indicated in the aforementioned figures.
Figure 5:
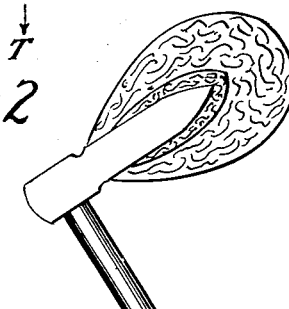
Figure 5 is a view of the piano action part of Figure 4, with bearings therein and being pinned to another member shown partially.
Figure 6:
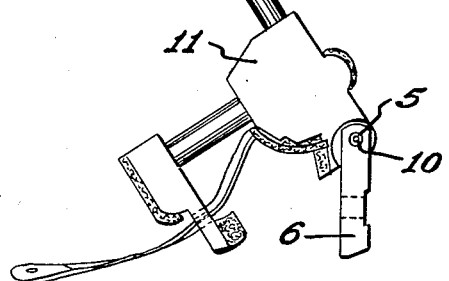
Figure 6 is a complete side view of the two action members of Figure 5 pinned together to form a pivotal connection of the two members.

The strips thus formed are then pulled into the bearing containing parts, such as the wooden bifurcated member 6 of Figures 4, 5 and 6 known as a flange and having axially alined bearing holes in its bifurcations or lips. As thus pulled in, the cloth becomes circumferential in the bearing holes. Glue is then applied to the cloth between the lips of a bearing member 6 and to the cloth at one side of it, and the member is pulled over these glue wetted portions. The member is then cut away at the outer faces of its lips, from the cloth strip and the length of the strip between the lips is cut away and discarded. It will be seen by examining the proportions of the bifurcated member 6, that only a small portion of the bushing cloth is thus used in the existing practice.

The formation of the bearings in a member 6—according to present practices in the art—is however not yet complete in the above. The center to employ the bearings must be noiseless in operation and thus a textile fabric is used for the bearings. The center, however, must also be durable and firm under the impacts imposed in the playing of a piano. Therefore sheep's wool is employed as a fabric substance since it is resilient. But to be durable and firm the bearing must be dense. Furthermore the shaft holes in the bearings must be alined for low friction operation of the shaft, or center pin as so named in the art, placed therein.

The present practices in making piano action center bearings solve these problems of durability and smooth operation by employing a wool cloth which is initially much thicker than its ultimate dimension in the bearing, and then carrying out further manual operations upon the cloth glued in the member as described above.

The cloth used, in fact, has a thickness about one-half the diameter of the bearing holes. Thus if the holes in a member 6 are .100" diameter the cloth is about .050" thick or slightly thicker, with no space present upon gluing the cloth in the member, for the center pin.

To provide the center pin space, the tight cylinders of bushing cloth in a bearing member such as 6, after the glue holding them therein has hardened, are opened in a preliminary manner by a slender rotating needle inserted momentarily along the axis of the bearing formation. Following this a metal rod of the diameter of the center pin—.051" for a particular pin—is driven with a forward rotary motion into the preliminary opening, radially compressing the cloth cylinders to a considerably denser condition. With the rod inserted the assembly is then dipped in water for a short time to permit the wool cloth cylinders to absorb moisture, and the assembly is allowed to dry before removing the rod. Wool of course absorbs water appreciably and if unopposed will swell with moisture absorption. However, under the confined condition imposed as described the wool cylinders are substantially prevented from altering their dimensions with moisture absorption. They therefore "fatigue" to the denser condition and upon drying are "set" to this condition, suitable for the use intended. Finally, upon removal of the compression rod the assembly is ready for use as a bearing combination, with center pin holes in the wool cylinders formed to a size adapted to a particular metal center pin and in alinement brought about by the straight compression rod.

My invention seeks to provide bearings which are considerably improved in their materials and formation, over the existing practices outlined above. Briefly, in a first aspect of my invention I provide a bearing material which has most of the desirable characteristics built into it. For this, I shall refer to Figures 1, 2 and 3.

Figure 1:
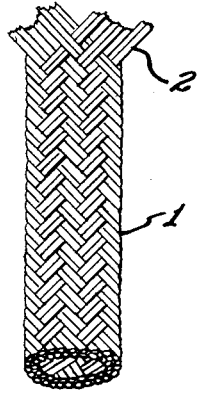
Figure 1 is a fragmentary view of braided sleeve formed for use in my invention.

In Figure 1 I have shown a braided tubular sleeve 1 which may be made continuously by machine. This sleeve 1 is comprised of many braid elements 2 in the form of cords, tight yarns, or thread. In selecting substances for these braid elements it is not beyond my invention to use resilient textile materials such as wool or silk, or even rubber elements. However, as a matter of preference I employ nylon, a synthetic proteinlike material, the term nylon being generic for any long-chain synthetic polymeric amide which has recurring amide groups as an integral part of the main polymer chain, and which is capable of being formed into a filament whose structural elements are oriented in the direction of the axis. Nylon, as a textile material, has advantages of appreciable elasticity, tensile strength, and resistance to abrasive wear.

In a practice of my invention, I employ—for the braid elements 2—size B nylon sewing thread, and it will be observed in Figure 1 that each element 2 is composed of a pair of such threads. In braiding the tubular sleeve 1 I employ twenty-four of such paired elements 2 (thus forty-eight size B threads in total) criss-crossed and interwoven as shown in Figure 1, and I braid the sleeving 1 to a size suitable for the use now to be described.

Figure 2:
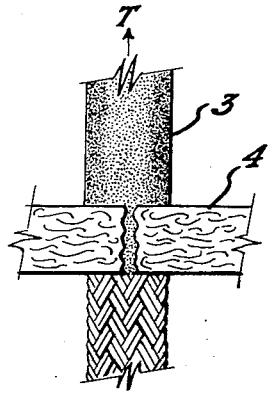
Figure 2 is a diagrammatic view of the sleeve of Figure 1, placed under tension, with coating material being applied to it while under tension.

In Figure 2 the braided sleeve 1 is placed under longitudinal tension, indicated by the arrows bearing the letters T. Also in Figure 2 a coating 3 in liquid form initially, it being applied to the sleeve 1 by feeding brushes 4 or other appropriate means of application. The coating 3 enclosing the sleeve 1 is of a type which dries and hardens to suitable tensile strength.

Tensioning the sleeve 1 while coating it has an advantage of bringing the braid elements 2 into close relationship so that the coating material attaches to the braid cylinder but does not penetrate to its interior surface for a center pin. With the use of nylon whose filaments are usually smooth the coating has the added advantage of increasing the interlocking of the braid elements 2.

It is an aspect of my invention that I employ a tension T of such an amount so that the braid elements 2 compress upon each other and the internal diameter of the finished coated material becomes reduced to a size adapted to an appropriate center pin. In carrying this out I maintain the tension T until the coating 3 has dried whereupon the coating itself retains the tubular material in suitable compressed, reduced condition. A further advantage of tensioning is that the braid elements are pulled to a less sinuous condition than as originally braided, thus presenting an increased surface to a center pin to be employed.

While coatings of various formulas may be employed, I prefer to use a nitrocellulose lacquer cement and I apply this cement in such an amount that upon drying it provides an outside diameter for the completed tube so that the tube fits snugly in a bearing hole 7 in a holding member 6 (Figure 4).

Figure 3:
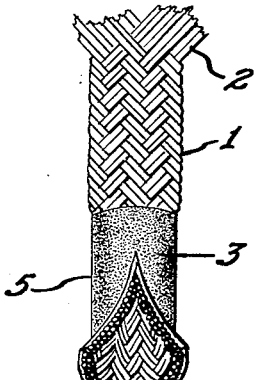
Figure 3 is a view of completed bearing material, partially cut and stripped to illustrate its structure.

The operations of Figure 2 may, paralleling the operation of Figure 1, be carried out continuously by machinery, and if necessary may be combined continuously with that of Figure 1. Figure 3 illustrates the completed material at 5, the material being stripped of coating in the upper part of the figure to show the return of the sleeve when unsupported, to its braided dimensions, and cut in the lower portion to display the cross-sectional and internal structure.

As the bearing material of my invention is thus prepared it comprises a stiff tube which may be thrust or pushed into a bearing hole, and not pulled in as is necessary in existing practices of the art using strips of wool cloth. In Figure 4 I have shown this thrusting operation along with others for forming completed bearings in a bearing holding member 6. The two approaching lengths of tubing 5 enter the outer ends of the bearing holes 7 in a bifurcated holder 6, in a forward, partially rotary motion as indicated by the arrows in the figure. Preferably I countersink the outer edges of the holes 7 to facilitate entrance of the tubing.

The tubing 5 is thrust only as far as the inner ends of the holes 7 in the holder 6. To limit the motion a suitable stop, not shown, may if necessary be provided. Upon complete insertion the tubing is cut off at the outer ends of the bearing holes 7, by thin rotating knives 8 brought into position at the proper time. The bearing forming operations thus described may be repeated indefinitely in a machine with proper feeds and speeds for parts and material. The bearing material as used is employed economically in that, except for the negligible amounts destroyed by the knives 8, it is utilized entirely in bearings. Moreover none of the component materials employed in the operations described in this specification are particularly costly.

As part of the operations of Figure 4 I have shown two applicators 9 which apply liquid to the tubing lengths 5 as they enter the holes 7. This liquid may be a cement—again a nitrocellulose cement—for attaching the bearings of this invention in a wood holder 6.

A further feature of my invention is that the liquid carried by the applicators 9 may be a solvent for the cementitious coating 3 of the tubing 5. In this the liquid may be a "slow" solvent, attacking the coating after a lapse of time. The immediate function of the solvent is then as a lubricant to facilitate inserting the tubes 5 in the holes 7 and to keep the knives 8 clean in operation. Its further function, in attacking the coating 3 is to reactivate the coating somewhat as to cementing properties and thus to attach the bearings to the holder 6. If the coating 3 is a nitrocellulose lacquer cement the liquid as a "slow" solvent may comprise a mixture of Stoddard Solvent (a liquid petroleum product also known as Safety Solvent) two thirds and Cellosolve (ethylene glycol monoethyl ether) one third by volume.

Figure 5 shows the joining of two piano action parts by a pivotal connection and Figure 6 illustrates a complete assembly so connected. The smooth metal center pin 10 is driven—as indicated by the arrow— into the two bushings composed of the material 5 in the holder or flange 6, with the end of a hammer butt 11 interposed and containing a hole in which the pin fits tightly. In Figure 6 the hammer butt 11 is shown in full with the hammer shank and head attached. In a complete upright piano about 330 pivotal connections or centers such as have been described in this specification, would be employed, with a greater number in a grand piano.

I should like to point out another feature of the present invention, namely that the braid elements 2 of a tube 5 are all disposed diagonally with respect to a center pin 10 which bears against them, as will be observed in the drawings. Thus all the braid elements are similarly effective in a bearing.

Still another feature of my invention is that I make the pin hole in the bearing material 5 somewhat smaller than a center pin 10. Thus the pin 10 is initially somewhat snug in the bearings. However, I have found that due, I believe, to compressional fatigue of the fabric material of the bearings and to plastic flow of the coatings 3, under pressure by the pin the center becomes free but firm with the bearings and pin in alinement, in a satisfactory amount of time.

It will be understood that modifications may be made in my invention without departing from its spirit. Having thus described the invention, those features which I claim as new and novel and which I desire to protect by Letters Patent, comprise:

1. A method of forming a bearing material for the pin bearings of pianos which comprises braiding a tubular body of flexible textile strands so as to form a sleeve, tensioning said sleeve so as to substantially to reduce its diameter and, while said sleeve is in said tensioned condition coating it superficially with a hardenable cementitious substance while leaving said strands free of said substance in the interior of said sleeve, whereby to fix the outside diameter of said sleeve in the reduced condition and to stiffen said sleeve so that it may be subjected to endwise thrust in inserting it in a perforation in a bearing holder.

2. The process of claim 1 in which the braided tubular body is axially tensioned during said coating and the hardening thereof.

3. The process of claim 1 in which as an incident to said coating step said tubular body is coated to a constant external diameter.

4. A bearing material for use with a perforated bearing holder and an internal shaft element for the pin bearings of pianos, said bearing material consisting of a braided, tubular body in cross-sectionally contracted condition and an outer, superficial, stiff, cementitious coating thereon, the internal diameter of said tubular body being smaller than the external diameter of a shaft element with which it is to be used, said coating maintaining the outer diameter of the bearing material to a size suitable for insertion into a perforation in a bearing holder.

5. The structure claimed in claim 4 in which said coating is an adhesive substance capable of reactivation to fasten said bearing material within a bearing holder.

6. The structure claimed in claim 4 in which said braided tubular body is formed of strands made up of textile fibres of protein type.

7. In a bearing assembly for use in a piano action, a perforated bearing holder, a tightly braided tubular sleeve of fibrous filaments inserted in the perforation in said holder, said tubular sleeve being in cross-sectionally contracted condition and having a coating of cementitious substance thereon binding said filaments in the contracted condition, and a shaft element in said tubular sleeve, the internal diameter of said tubular sleeve in the contracted condition being slightly smaller than the external diameter of said shaft, so as to snugly receive said shaft, the interior surface of said tubular sleeve being free of said cementitious substance.

8. The structure claimed in claim 7 in which said cementitious substance is an adhesive substance capable of reactivation.

9. The structure claimed in claim 7 wherein said cementitious substance is a cellulose cement which ultimately dries to a hard and relatively non-plastic condition.

10. The structure claimed in claim 7 wherein said braided tubular sleeve comprises a braid of nylon strands, said braid having at least twelve strands, said strand each being of the double thread variety.

11. A method of forming a bearing assembly for piano actions which comprises providing a tubular body of flexible textile strands forming a sleeve, tensioning said sleeve so as to substantially reduce its diameter, and, while said sleeve is in said tensioned condition, coating it externally with a hardenable cementitious substance while leaving said strands free of said substance on the interior of said sleeve, said cementitious substance serving to fix the outside diameter of said sleeve in the reduced condition and to stiffen said sleeve so that it may be subjected to endwise thrust, and thereafter thrusting the said sleeve axially into the bearing hole of a bearing holder and adhesively securing said sleeve in place therein.

12. The method claimed in claim 11 wherein said cementitious substance is capable of reactivation, and wherein the step of thrusting said sleeve axially into the bearing holder includes the application of a reactivating substance to the said coating to cause said sleeve to become adhesively secured to the bearing holder by said cementitious substance.

ARMAND F. KNOBLAUGH.

REFERENCES CITED

The following references are of record in the file of this patent:

UNITED STATES PATENTS

| Number | Name | Date |
| --- | --- | --- |
| 937,021 | Cobb | Oct. 12, 1909 |
| 1,104,777 | Cobb | July 28, 1914 |
| 1,369,196 | Semple | Feb. 22, 1921 |
| 2,188,722 | Geyer | Jan. 30, 1940 |

FOREIGN PATENTS

| Number | Country | Date |
| --- | --- | --- |
| 500,077 | Great Britain | Feb. 2, 1939 |